United States Patent [19]

DiSanto et al.

[11] Patent Number: 5,359,346
[45] Date of Patent: Oct. 25, 1994

[54] ELECTROPHORETIC DISPLAY PANEL AND ASSOCIATED METHODS FOR BLINKING DISPLAYED CHARACTERS

[75] Inventors: Frank J. DiSanto, North Hills; Denis Krusos, Lloyd Harbor, both of N.Y.

[73] Assignee: Copytele, Inc., Huntington Station, N.Y.

[21] Appl. No.: 88,615

[22] Filed: Jul. 7, 1993

Related U.S. Application Data

[63] Continuation of Ser. No. 841,364, Feb. 25, 1992, abandoned.

[51] Int. Cl.$^5$ ............................................. G09G 3/34
[52] U.S. Cl. ...................................... 345/107; 345/141
[58] Field of Search ....................... 340/787, 788, 783; 359/296; 345/107, 141, 84, 55, 56

[56] References Cited

U.S. PATENT DOCUMENTS

| | | | |
|---|---|---|---|
| 4,201,983 | 5/1980 | Magerl et al. | 340/709 |
| 4,395,709 | 7/1983 | Nagae et al. | 340/811 |
| 4,742,345 | 5/1988 | DiSanto et al. | 340/752 |
| 4,746,917 | 5/1988 | DiSanto et al. | 340/787 |
| 5,053,763 | 10/1991 | DiSanto et al. | 340/787 |
| 5,077,157 | 12/1991 | DiSanto et al. | 430/20 |

OTHER PUBLICATIONS

"Flat-Panel Display and CRTs" Tannas. Fr.1985 pp. 21–22.

Primary Examiner—Ulysses Weldon
Assistant Examiner—Doon Chow
Attorney, Agent, or Firm—Plevy & Associates

[57] ABSTRACT

A tetrode type electrophoretic display includes local anode lines electrically grouped into groups having the width of a character. In operation, the local anode may be used to blink selected characters by applying appropriate voltages to the various electrodes of the display in the proper sequence. Sequencing is controlled by a computer and associated software.

17 Claims, 6 Drawing Sheets

ELECTROPHORETIC DISPLAY PANEL AND ASSOCIATED METHODS FOR BLINKING DISPLAYED CHARACTERS

This is a continuation of application Ser. No. 07/841,364 filed Feb. 25, 1992, now abandoned.

FIELD OF THE INVENTION

The present invention relates to an electrophoretic display panel apparatus and methods of operation and, more particularly, to multi-electrode electrophoretic display panels which permit the blinking of displayed characters.

DESCRIPTION OF THE PRIOR ART

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, New York. For example, U.S Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc. The following issued patents and pending applications by the inventors herein and assigned to CopyTele, Inc. and which may have some relevance to the present invention are: application Ser. No. 07/794,969, filed Nov. 20, 1991, entitled ELECTROPHORETIC DISPLAY PANEL WITH INTERNAL MESH BACKGROUND SCREEN; DUAL ANODE FLAT PANEL ELECTROPHORETIC DISPLAY APPARATUS, U.S. Pat. No. 5,053,763, issued Oct. 1, 1991; ELECTROPHORETIC DISPLAY WITH SELECTIVE LINE ERASURE, U.S. Pat. No. 5,066,946 issued Nov. 19, 1991; SEMI-TRANSPARENT ELECTROPHORETIC INFORMATION DISPLAYS (EPID) EMPLOYING MESH LIKE ELECTRODES, U.S. Pat. No. 5,041,824 issued on Aug. 20, 1991; application Ser. No. 752,184 filed on Aug. 23, 1991 entitled ELECTROPHORETIC DISPLAY WITH SINGLE CHARACTER ERASURE, which is a continuation of Ser. No. 699,216 filed on May 13, 1991 having the same title; application Ser. No. 07/667,630, filed Mar. 11, 1991, entitled ELECFROPHORETIC DISPLAY PANEL WITH PLURAL ELECTRICALLY INDEPENDENT ANODE ELEMENTS, each of which are indicated below.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic field and the charge on the pigment particles. Certain of the electrophoretic display apparatus taught in such issued Patents are "triode-type" displays having a plurality of independent, parallel, cathode row conductor members deposited in the horizontal with transverse grid lines insulated from the anode lines. The grid and cathode lines form an X-Y matrix which can be accessed to address and control the pigment particles according to a selected X-Y intersection or pixel. U.S. Pat. No. 5,041,024 depicts a "tetrode" type display including a mesh electrode located between the anode and the X-Y grid cathode matrix. The operating voltages on both of the cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

An alternative EPID construction is described in U.S. Pat. No. 5,053,763, referred to above, which relates to an electrophoretic display in which the cathode/grid matrix as is found in triode-type displays is overlayed by a plurality of independent separately addressable "local" anode lines to constitute a "tetrode". The local anode lines are deposited upon and align with the grid lines and are insulated therefrom by interstitial lines of photoresist. The local anode lines may be in addition to a "remote" anode, which is a layer deposited upon the anode faceplate as in triode displays. The dual anode structure aforesaid provides enhanced operation by eliminating unwanted variations in display brightness between frames, increasing the speed of the display and decreasing the anode voltage required during Write and Hold cycles, all as explained in application Ser. No. 07/345,825, which is incorporated herein by reference.

In yet another form of EPID, as described in application Ser. No. 07/667,630, a triode is formed by a plurality of independent anode elements deposited upon one faceplate and a plurality of independent cathode elements deposited at right angles thereto on an opposing faceplate. An electrically continuous grid with a plurality of pores therein is deposited upon a layer of insulation overlying the cathode lines and is intermediate the cathode and anode lines.

To be useful as a display, an electrophoretic display must be able to assume a blank or erased state, must be able to display character data written during a write operation; and must be able to continually maintain or hold the written characters (and blank characters) in a hold mode until they are erased or overwritten. These three modes of operation, i.e., erase, write and hold are well documented in existing patents issued to the inventors herein and such description shall not be repeated at length herein. Whereas the above-described patents and pending patent applications provide apparatus and methods for hold, full write (all pixels written), full erase (all pixels erased), selective write (writing selective pixels in previously erased positions), selective character line erasure and selective character erasure, previous apparatus and methods do not describe selective character blinking.

It is therefore an object of the present invention to provide a method for operating an electrophoretic display to allow character blinking.

SUMMARY OF THE INVENTION

The problems and disadvantages associated with pixel display control in conventional electrophoretic displays are overcome by the present invention which includes in a tetrode-type electrophoretic display of the type having a plurality of parallel cathode lines arranged in a given direction, a plurality of parallel grid lines insulated from the cathode lines and perpendicular thereto to form an X-Y addressing matrix, a plurality of local anode lines deposited upon the grid lines and insulated therefrom by insulator strips, a remote anode separated from the local anode lines with the space therebetween accommodating an electrophoretic dispersion including pigment particles suspended in a fluid and an electrically conductive screen allowing the pigment particles to pass therethrough, the improvement of grouping each of the local anode lines into groups having a width approximately the width of a displayable character. In a method of operating the display the cathode lines, the grid lines, the screen, the local anode lines and the remote anode are electrically connected to a source of electrical potential energy. The source provides a selected set of independent voltages to each of the cathode lines, the grid lines, the screen, the local anode lines and the remote anode under the control of a controller for controlling the independent voltages supplied by the source. By controlling the source of electrical potential energy, voltage levels are applied to the cathode matrix, the grid matrix, the screen, the local anode lines and the remote anode to blink selected characters on the display.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
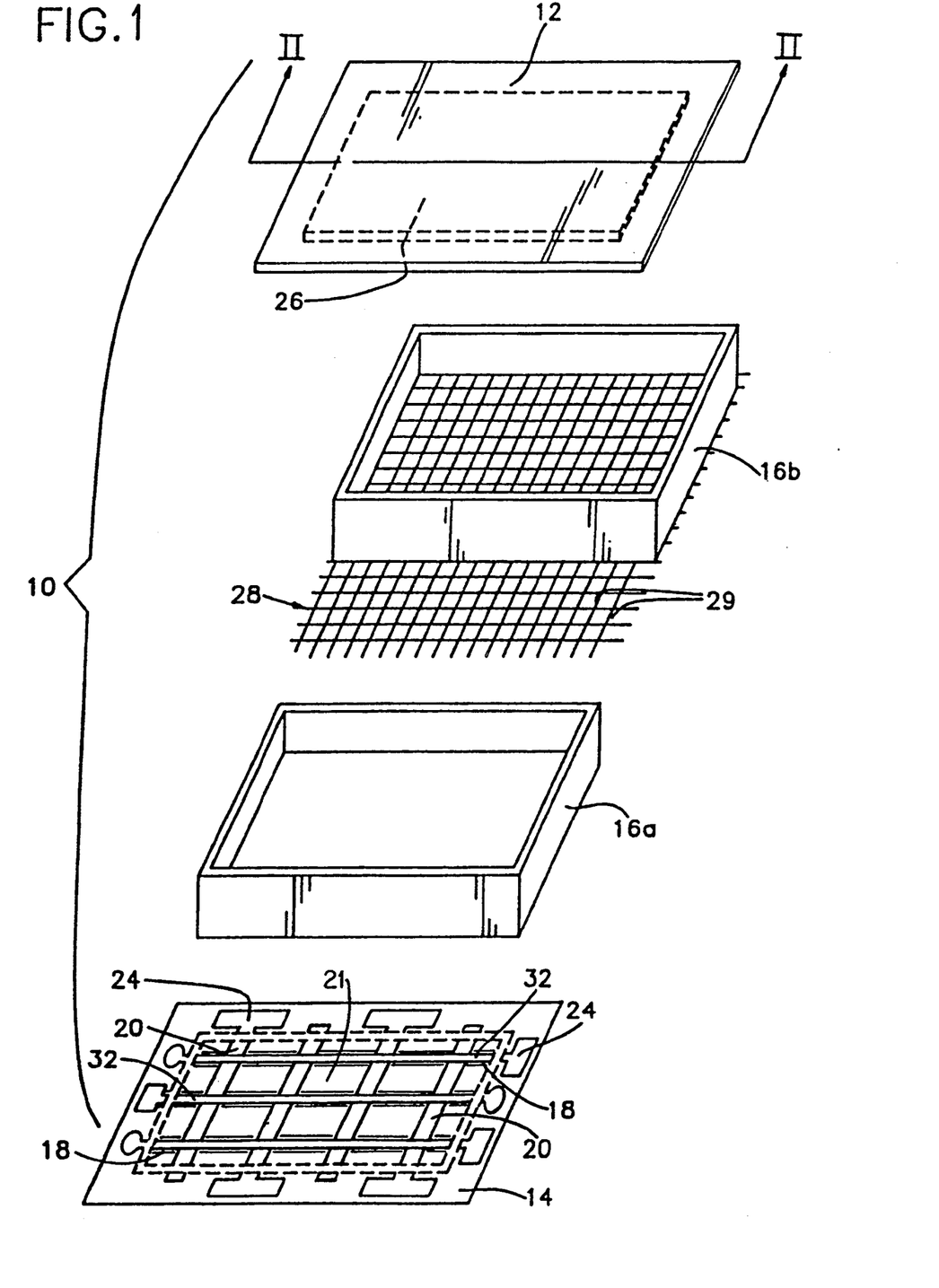
FIG. 1 is an exploded perspective view of an electrophoretic display in accordance with an exemplary embodiment of the present invention.

FIG. 1 shows an electrophoretic display 10 in accordance with the present invention. The display 10 has an anode faceplate 12 and a cathode faceplate 14 which are sealably affixed on either side of intermediate spacers 16a and 16b to form a fluid tight envelope for containing dielectric/pigment particle suspension or electrophoretic fluid (not shown). The faceplates 12 and 14 are typically flat glass plates upon which are deposited conductor elements to comprise the site of electrostatic charge for inducing motion in the electrophoretic fluid. The techniques, materials and dimensions used to form the conductor elements upon the faceplates and the methods for making EPIDS, in general, are shown in U.S. Pat. Nos. 4,655,897, 4,732,830 and 4,742,345 which patents are incorporated herein by reference.

In the invention, as depicted in FIG. 1, for example, a plurality of independent, electrically conductive cathode members 18 (horizontal rows) are deposited upon the cathode faceplate 14 using conventional deposition and etching techniques. It is preferred that the cathode members 18 be composed of Indium Tin Oxide (ITO) as set forth in U.S. Pat. No. 4,742,345. A plurality of independent grid conductor members 20 are superimposed in the vertical over the cathode members 18 and are insulated therefrom by an interstitial photoresist layer 22 (see FIG. 2). The grid members 20 may be formed by coating the photoresist layer 22 with a metal, such as nickel, using sputtering techniques or the like, and then selectively masking and etching to yield the intersecting but insulated configuration shown in FIGS. 1 and 2. Each cathode and grid member 18, 20 terminates at one end in a contact pad 24 or is otherwise adapted to permit connection to display driver circuitry (not shown).

As can be appreciated from FIG. 1, the overlaying of grid lines 20 upon cathode lines 18 creates a plurality of wells 21 bounded by the intersecting lines 20 and 18. As is taught in prior patents, more wells 21 may be defined by forming the grid lines 20 and cathode lines 18 in a fined configuration. The wells 21 communicate with the fluid contained within the EPID and thus permit pigment particles to travel close to the glass cathode faceplate 14 where they are most clearly visible.

Figure 2:
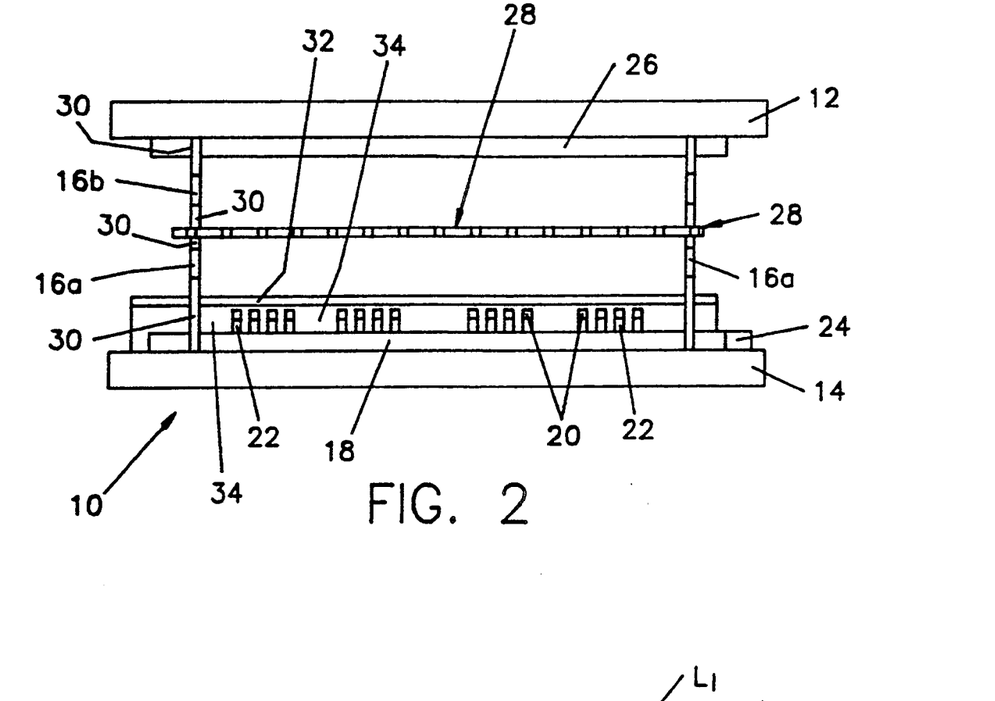
FIG. 2 is a cross-sectional view of the electrophoretic display shown in FIG. 1 in the unexploded state, taken along section line II—II and looking in the direction of the arrows.

An anode 26 is formed on an interior surface of the anode faceplate 12 by plating with a thin layer of conductor material, such as, chrome. A mesh element or screen 28 is sandwiched between spacers 16a and 16b to provide at least a partial barrier to the passage of light through the EPID 10. The mesh screen 28 has a plurality of pores 29 through which pigment particles may pass so as not to obstruct the normal operation of the EPID. Coincidental to the light barrier function, the mesh itself is an optically significant element, i.e., it is readily visible to the naked eye. It is preferred that the mesh appear as a flat planar object. This is achieved by making the mesh with the minimum pore size which does not critically impede pigment movement. A mesh screen having suitable characteristics is commercially available from the Buckee Mears Co., viz., a perforated stainless steel mesh having an approximate thickness and pore size of 10 to 12 mils. The mesh has an open area ratio, i.e., the ratio of the sum of pore area to the total surface area on one surface of the screen, of approximately 40% to 50%. The mesh is blackened by an anodizing process. The significance of the mesh screen 28 is that it provides a solid visual background for the display of pixels and it permits a reduction of dye concentration to effect a desired background intensity. It has also been observed that the above-described mesh screen provides such an effective background that no dye is required. The mesh screen 28 also functions to prevent inadvertent backlighting due to the overall translucence of the EPID 10. It should be observed that the screen 28 is positioned in the EPID 10 such that when the pigment is in the display position, it is on one side of the screen 28 and when it is in the written position it is on the other side of the screen 28, obscured from view by the screen 28 and/or dye in the solution.

In the present invention, the screen 28 is fabricated from an electrically conductive material so that it can be utilized to carry an electric charge for the purpose of aiding in controlling the movement of the pigment particles. FIGS. 1 and 2 illustrate the incorporation of the mesh screen 28 into a tetrode-type display. The tetrode display includes a plurality of local anode elements 32 which are deposited upon corresponding photoresist insulator strips 34 (see FIG. 2) formed perpendicular to the grid elements 20. The methods for forming the local anode elements 32 are set forth at length in application Ser. No. 07/345,825. In brief, a layer of SiO2 is applied over the grid elements 20, followed by a layer of photoresist. A layer of metal, e.g., nickel or aluminum, is applied over the photoresist layer. Yet another layer of photoresist is applied over the metal layer, and is then masked, exposed and developed perpendicular to the grid elements. The metal layer is then etched with a suitable solution. The photoresist is then plasma etched.

To form an EPID 10 like that shown in FIG. 1, the parts may be assembled in a stack and placed in an oven for baking. The spacers 16a and 16b, in that case, would be coated on surfaces which contact adjacent elements with a material which would become plastic at baking temperatures, such as, epoxy. Upon baking, the meltable material flows and the elements form a laminate upon cooling. Of course, other methods exist within the scope of the normally skilled artisan for assembling the elements of the EPID 10 shown, such as, e.g., gluing. The lamination of the EPID elements forms an envelope for containing the dielectric fluid/pigment particle suspension.

The discrete cathode and grid members 18 and 20 of the electrophoretic display 10 can assume a variety of voltages during operation for controlling the display operations of erase, hold and write at the numerous points of intersection defining a cathode/grid matrix. A display panel would have a large number of intersections, e.g., 2,200×1,700 or a total of 3,740,000 separately addressable intersection points. For ease of illustration, however, only a few cathode members 18 and grid members 20 are depicted. Similarly, the shape and proportions of the elements depicted are for purposes of illustration only. The dimensions of the respective elements have also been greatly enlarged for illustration and are not necessarily in proportion to an actual operational device. More illustrations of electrophoretic displays, their components and electrical circuitry can be seen by referring to U.S. Pat. Nos. 4,742,345 and 4,772,820, each being awarded to the inventors herein and which are incorporated by reference herein.

Certain details have been omitted from the device depicted, but are taught in prior patents. For example it has been determined that a SiO2 coating on certain of the conductor elements provides beneficial results. See application Ser. No. 07/675,733, filed Mar. 27, 1991 and entitled ELECTROPHORETIC DISPLAY PANEL WITH SEMICONDUCTOR COATED ELEMENTS by the inventors herein and assigned to the assignee herein.

It has previously been shown that certain conductor elements having a tined configuration provide enhanced resolution, see U.S. Pat. No. 4,742,345 issued to the inventors herein and assigned to the present assignee, such patent being incorporated herein by reference. In the present invention, it is preferred that each local anode line have a tined configuration as described more specifically below.

FIG. 2 shows the electrophoretic display of FIG. 1 assembled and in cross-section. The remote anode 26 in the embodiment shown, is a plate-like area of conductor material having a length and width essentially matching that of the cathode/grid matrix, i.e., coextensive with the matrix, as is taught in the above referenced patents and applications of the present Applicant. The cathode elements 18, grid elements 20 and grid insulator strips 22 as are also like those shown in the foregoing patents, etc. Since all conductor elements are quite thin, they extend beneath the interstitial spacers 16a and 16b without special provision and at least one end thereof provides a terminal exterior to the envelope for connecting display driver circuitry (not shown). For the purposes of illustration, epoxy bonding material 30 is depicted providing the laminating bond between spacers 16 and the faceplates 12 and 14 and for laminating the mesh screen 28 between the spacers 16a and b.

A tined configuration for the grid lines 20 is depicted in FIG. 2. Similarly, each local anode line preferably has four tines 33 which may, for example be about 16.8 um wide and separated 35 by a space approximately 15 um wide, each tine rejoining a common electrically continuous portion of the local anode at both terminal ends.

Figure 3:
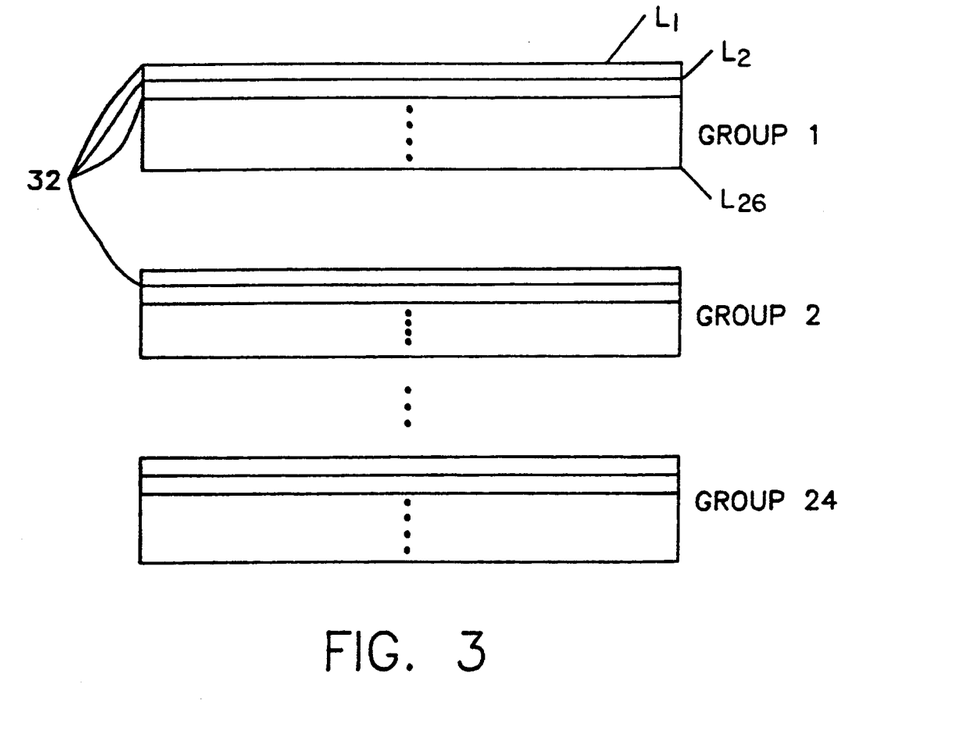
FIG. 3 is a schematic diagram of the local anode lines of the display which are grouped in sets.

FIG. 3 shows the electrical grouping of local anode lines 32 into 24 groups of 26 lines each. The width of each grouping approximates the width of a displayable character. Given that an object of the invention is to provide control over individual characters for blinking, it is preferred that the local anode lines are controlled in groups so that an entire character is blinked on and off rather than selected pixels. Blinking of individual pixels by controlling individual local anode lines could also be employed to achieve the desired effect and is within the realm of the present invention but as a practical matter resolution to the character level is sufficient.

The operation of the display will now be described. For the purposes of illustration, the following may be taken as initial assumptions: (1) negatively surface-charged, light colored pigment particles suspended in a clear or dark dielectric fluid; (2) a dark colored screen element 28; and (3) visualization of the image at the cathode faceplate 14. Given these initial conditions, a written pixel is represented by the absence of visible pigment particles, hence is a dark pixel. Erased pixels would be represented by visible pigment particles at that location. For example, a totally erased display is completely light colored due to the presence of visible pigment particles at the cathode faceplate. It should be understood that these assumptions are merely exemplary, given that the surface of visualization could be the anode faceplate. Alternatively, the coloration of the particles and the background could be altered, etc., all within the confines of the present invention as described herein.

Since the voltages applied to the various elements of the display for a given function will depend upon the dimensions and distance between elements, the following dimensions can be assumed for the purposes of illustration:

(1) Cathode line 18 width=112 $\mu$m.
(2) Cathode line 18 spacing=15 $\mu$m.
(3) Photoresist layer 22 thickness=3–4 $\mu$m.
(4) Grid line 20 width and composition=112 $\mu$m (6 tynes), chrome
(5) Photoresist layer 34 thickness=3–4 $\mu$m.
(6) Local anode 32 width=112 $\mu$m (4 tynes).

(7) Distance from mesh 28 to local anode 32=7 mils.
(8) Remote anode 26 composition=ITO.
(9) Distance from mesh 28 to remote anode 26=7 mils.

Given the foregoing assumptions, exemplary voltages applied to the various elements in the EPID to perform certain basic functions and for performing the function of single pixel erase are set forth below.

For the following operations, typical voltages would be:

+V1=+200 (PULSED TO +400 DURING FULL WRITE)
−V1=−300
+V2=+140
−V2=−200
+V3=+20 (PULSED TO +32 DURING WRITING OF IMAGE)
GRID (VDD)=0 (PULSED TO +5 DURING WRITING OF IMAGE)
GRID (VSS)=−10
CATH.(VDD)=+15 (PULSED TO +18 DURING WRITING OF IMAGE)
CATH.(VSS)=0
VAC=100 V RMS
(ANODE=REMOTE ANODE; L.A.=LOCAL ANODE)

TO PERFORM FULL WRITE APPLY THE FOLLOWING VOLTAGES:
V ANODE=+V1
V MESH=VAC
V L.A.=0
V GRID=GRID (VDD)
V CATH=

TO PERFORM FULL ERASE:
V ANODE=−V1
V MESH=−V2
V L.A.=0
V GRID=VDD
V CATH=0

TO PLACE THE DISPLAY IN A HOLD CONDITION:
V ANODE=+V1
V MESH=+V2
V L.A.=0
V GRID=GRID (VSS)
V CATH=CATH.(VDD)

TO PREPARE FOR SELECTIVE PIXEL WRITING:
The GRID is raised to GRID (VDD) and the returned to GRID (VSS) to remove excess pigment from the wells. Pigment moves from the MESH to the REMOTE ANODE by applying the following voltages:
V ANODE=+V1
V MESH=VAC
V L.A.=0
V GRID=GRID(VSS)
V CATH=CATH.(VDD)
LOCAL ANODE HOLD is then established by applying the following voltages:
V ANODE=+V3
V MESH=0
V L.A.=+V3
V GRID=GRID(VSS)
V CATH=CATH.(VDD)

TO WRITE IMAGE:
The image is then written on the local anode by selectively raising appropriate GRID to GRID (VDD) and sequentially lowering cathode lines to 0 volts. During the writing mode, the pigment passes from the cathode faceplate through the spaces between the local anode tines to the local anode. The purpose of writing on the local anode is to permit subsequent erasure of the panel from the local anode which eliminates the flash which occurs when erasing from the remote anode and also to permit single character erase and rewrite.

TO SELECTIVELY ERASE A GIVEN CHARACTER:
The local anode lines are grouped as described above. When it is desired to erase a particular character, the grid and anode lines intersecting at that character are given the following potentials:
V GRID=GRID (VDD)
V L.A.=0
The remaining elements receive the following potentials:
All other grids=GRID (VSS)
All other local anodes=+V3
V CATH=CATH. (VDD)

TO PLACE SELECTED PIXEL IN HOLD:
Intersecting Grid line=GRID (VSS)
Intersecting Local Anode=+V3

Figure 4:
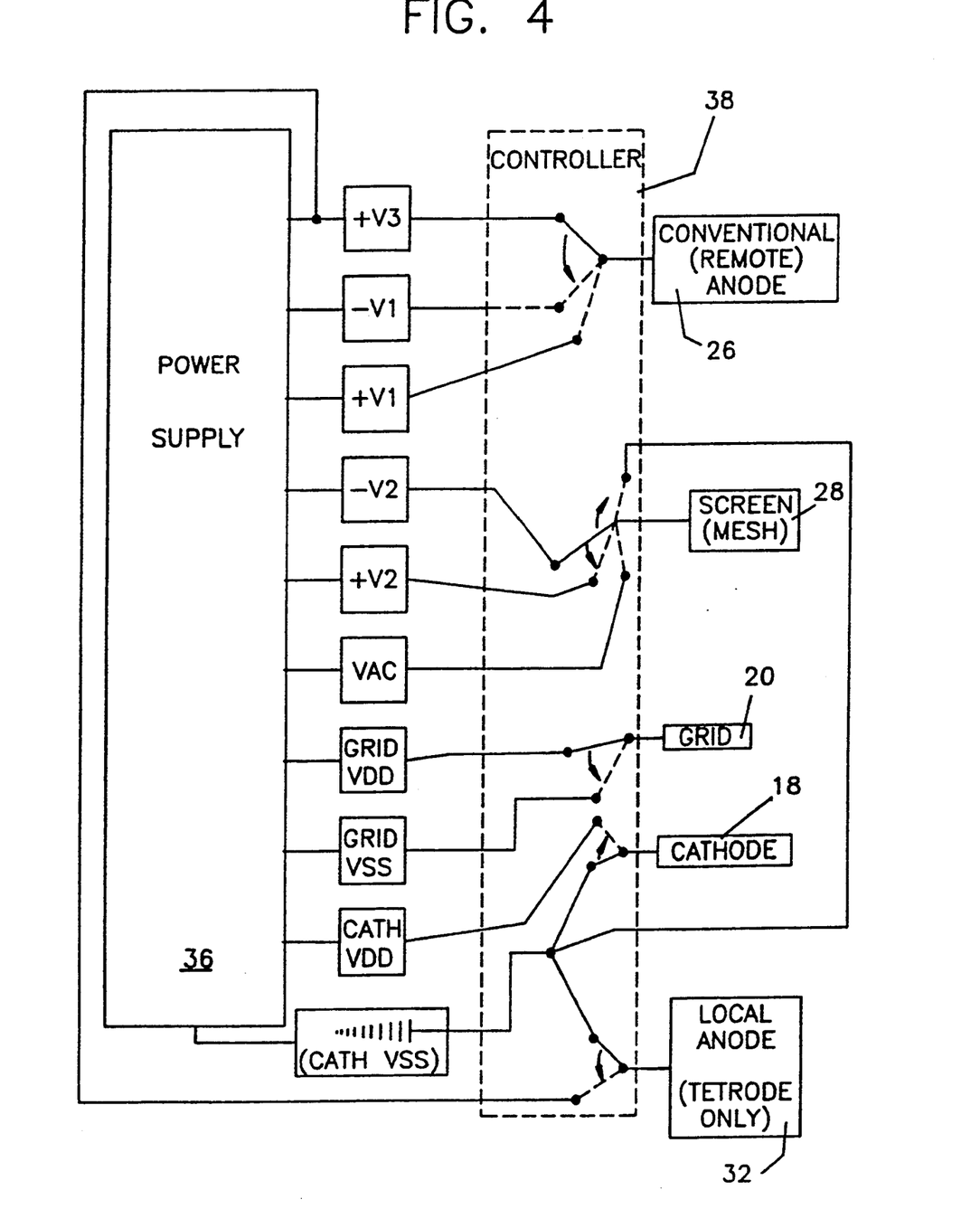
FIG. 4 is a schematic diagram showing the connection of the devices depicted in FIGS. 1 and 2 to a power supply as controlled by a controller.

FIG. 4 illustrates in schematic form how the various components of the electrophoretic display described above in reference to FIGS. 1, 2 and 3 might be electrically connected to a suitable power supply 36 under the control of a digital controller 38 in order to assume the correct voltage states during the operations described.

Given the foregoing general operating parameters, the blinking of a single character can be achieved. This blinking will be illustrated by the following exemplary program, i.e., "BLINK 1", considered in conjunction with the flow chart appearing in FIGS. 5 and 6.

Figure 5:
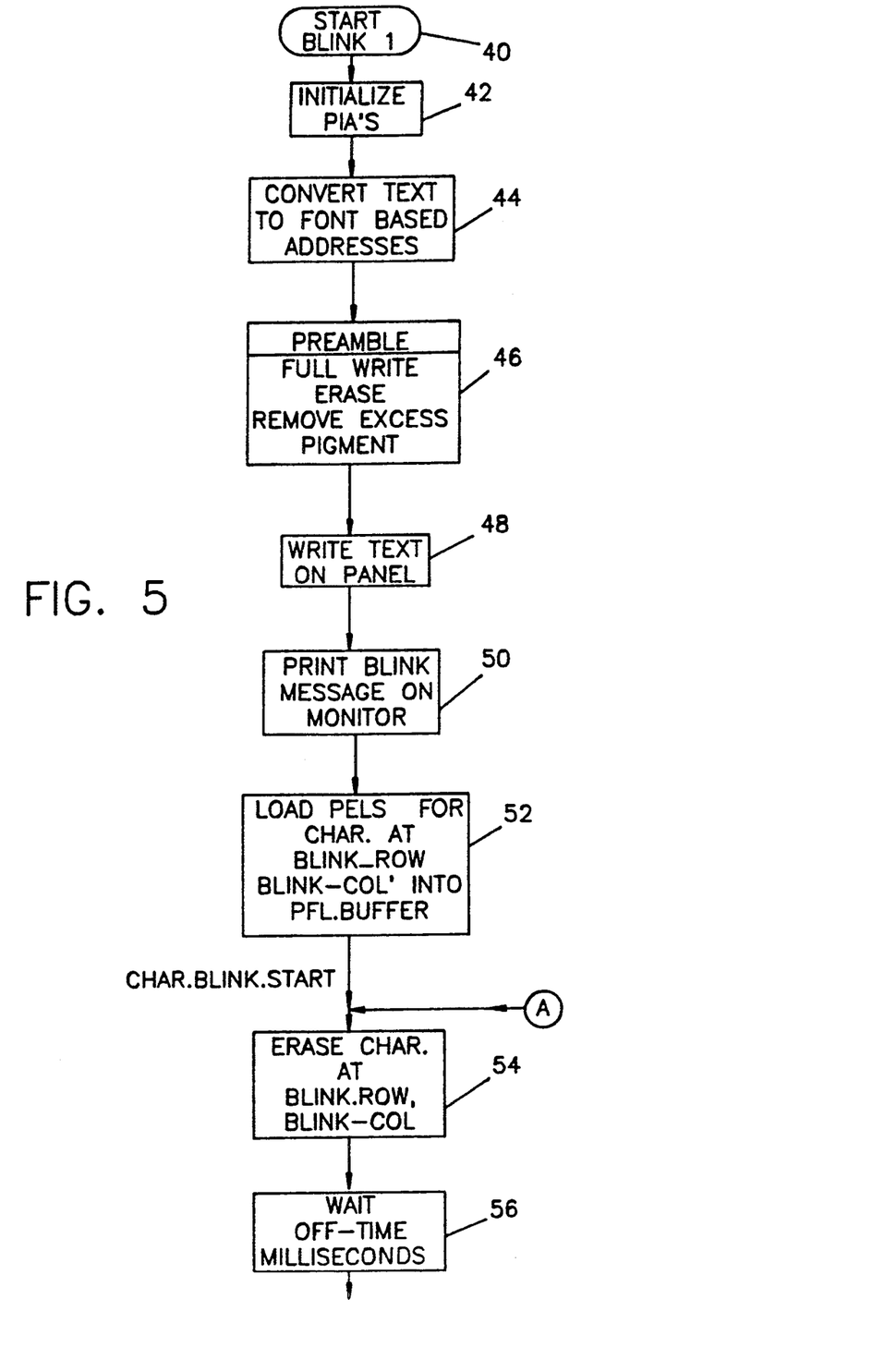
FIGS. 5 and 6 are flowcharts of an exemplary program for effecting character blinking.
Figure 6A:
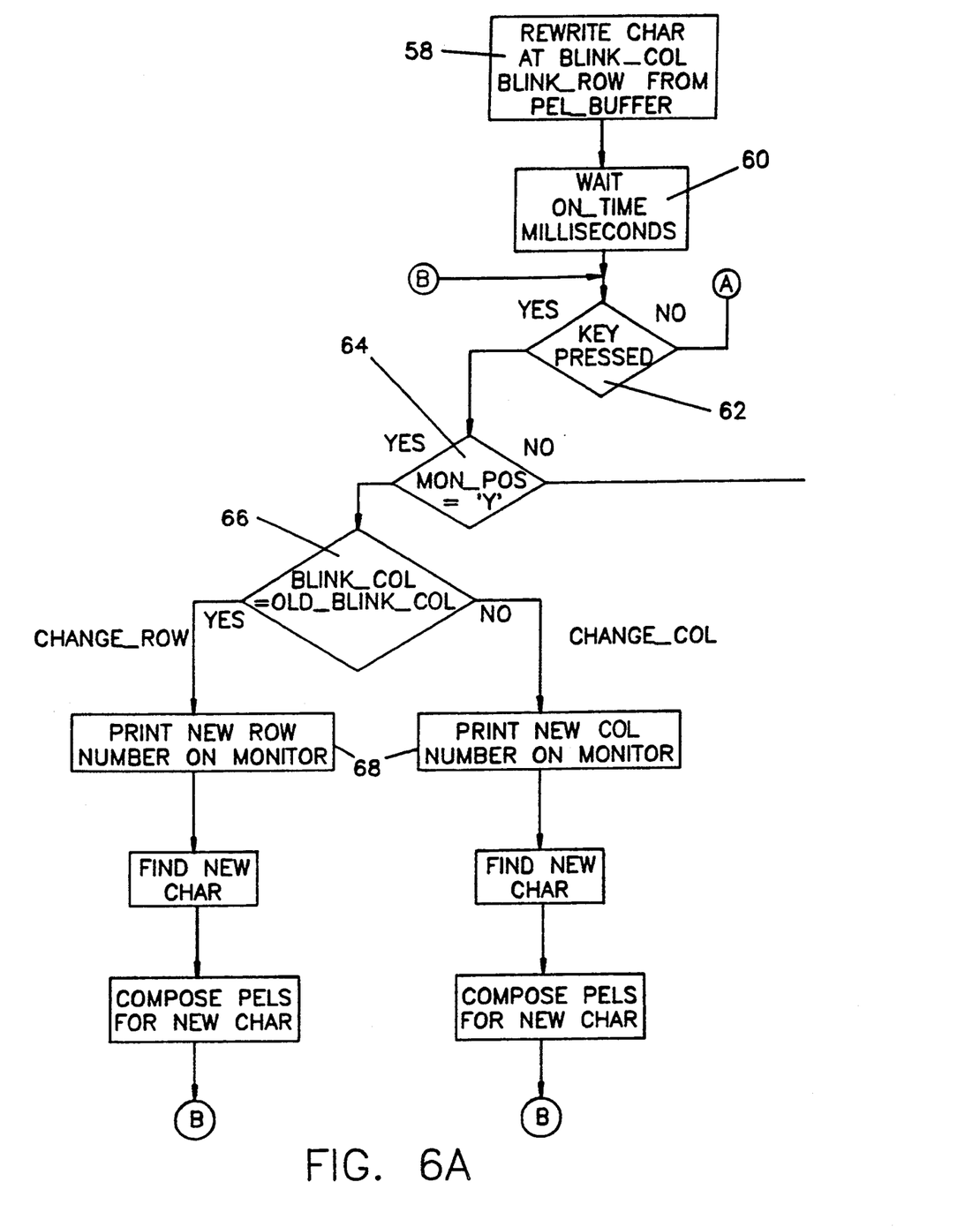
Figure 6B:
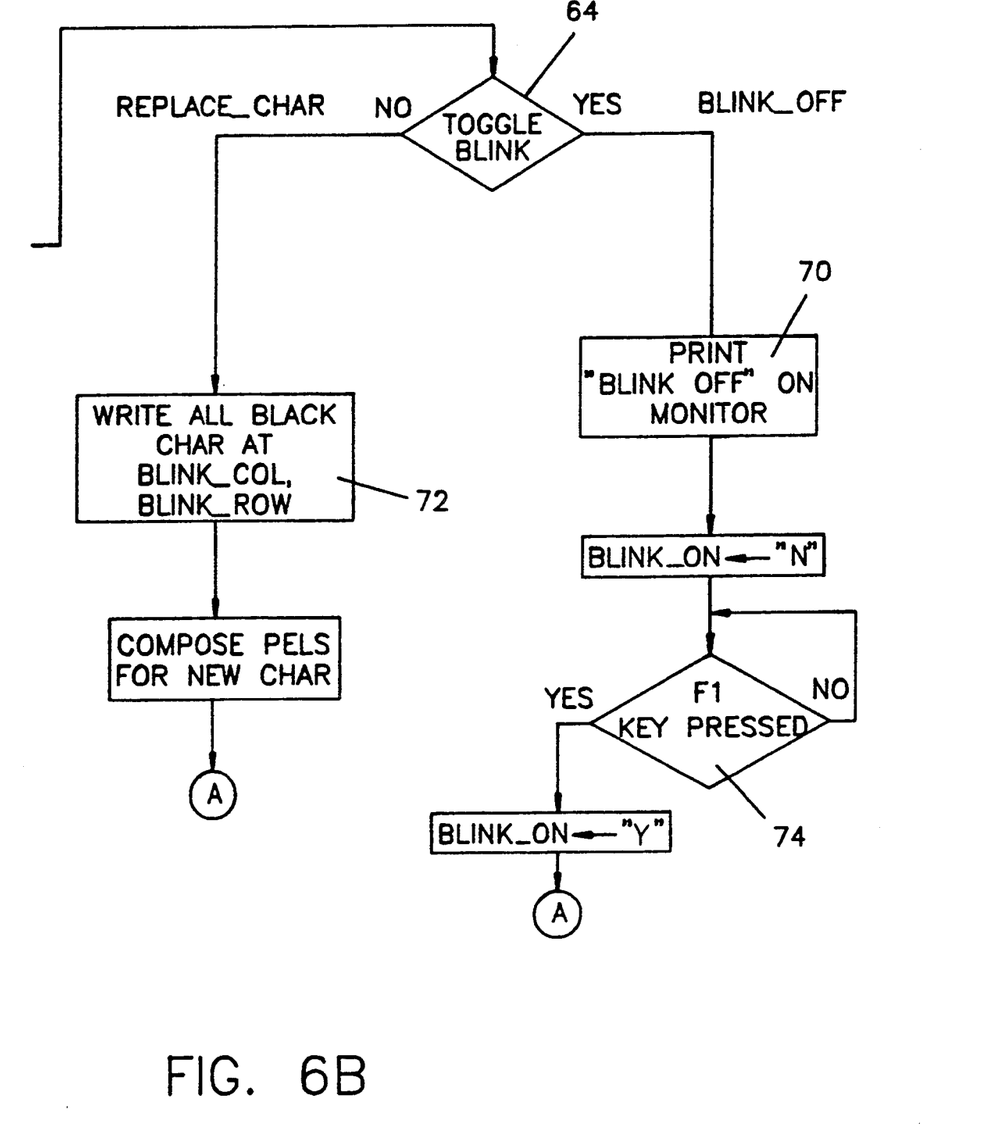

BLINK1 starts 40 by defining external and public variables. Then the model and stack size are defined; the file TEXT5.ASM which contains the text to be written on the panel initially is then listed as an include file. Subsequently the equates and memory are defined.

Following the memory definitions, a number of macros are listed; these macros are used where the processor time required for a call to a subroutine is too long. In-line code begins at the label BLINK1 40. The first lines of code set up the return address for the operating system; this is followed by initialization of the PIA's by the call to PIA__ initialize 42. The panel is then put into erase and the column and row drivers are set low and high respectively.

After initialization, the program title and copyright notice are printed on the monitor. The text in TEXT5.ASM is converted so that each character is represented by its corresponding font address 44. Following this conversion, the preamble 46 is performed. The preamble sequentially performs full write, erase, hold, two periods of excess pigment removal followed by two periods of AC on the mesh. At this point the panel is ready for writing.

After the preamble, the text contained in TEXT5.ASM is written on the panel using the local anode 48; during the write period the mesh and the remote anode are connected together and tied to a low voltage. After writing, the panel is ready for the blink portion of the program.

Prior to starting the blink sequence, the desired position of the blink is loaded into blink__col,blink__row and printed on the monitor 50. The character located at this position is then located via the subroutine (S/R) find__ char and its pel composition is loaded 52 into the buffer area pel_buffer using the S/R compose_pels.

Now the blink sequence begins. The first step is to erase the character located at blink_col, blink_row 54. After erasing this character this state is retained for a period equal to off_time milliseconds 56. After off_time milliseconds has passed the character is re-written 58. The character is re-written using S/R rewrite_char. The S/R rewrite_char uses the pels stored in pel_buffer to re_write the character at blink_col, blink_row. A wait of on_time milliseconds 60 is used before the erase re_write cycle is repeated.

Following each on-time of the blink cycle, the processor is checked to see if a key was pressed 62; this done via a call to the S/R chk_for_key. This subroutine reports whether or not a key was pressed and the type of key, i.e. an arrow key, a function key, etc. 64. If an arrow key was entered 66, the appropriate position buffer is either incremented or decremented and the blink cycle is continued at this new position 68. If the F1 function key is entered 70 the blink sequence is suspended after the character is re-written. If a character key is pressed 72, the character entered replaces the character at the current blink position.

During the period where blinking is disabled, the processor checks for function key F1 74; if F1 is entered, blinking is resumed at the position it was suspended.

It should be understood that the embodiments described herein are merely exemplary and that a person skilled in the art may make many variations and modifications without departing from the spirit and scope of the invention as defined in the appended claims.

We claim:

1. An electrophoretic display apparatus adapted to display a plurality of written character lines with at least one selected character of said display blinking in a manner visible to the user of said apparatus, comprising:
   a fluid-tight envelope having a portion thereof which is at least partially transparent;
   an electrophoretic fluid contained within said envelope, said fluid having pigmented particles suspended therein, and a matrix of row and column electrodes passing through said envelope and said fluid;
   a plurality of anode segments passing through said envelope, wherein each displayed character area of said display is defined by at least one of the anode segments and by a corresponding group of row and column electrode intersections;
   supply means for supplying individual voltages to selected row and column intersections and to said anode segments to write characters to said display;
   control means coupled to said supply means, said control means operating said supply means to cause written characters to remain continuously visible to said user while also causing said supply means to sequentially apply a first potential bias of a given polarity between a group of row and column intersections corresponding to a displayed character area and an associated anode segment long enough to cause pigment particles to move relative to said intersections and to thereby erase a character written to said displayed character area and a second potential bias of an opposite polarity between said anode segment and said group of row and column intersections for a period of time sufficient to re-write said character to said displayed character area, said supply means being responsive to said control means to alternately apply said first and second potential bias so that said selected character is blinked in a manner visible to said user; and
   a remote anode coupled to said supply means, said supply means being further responsive to said control means to supply a third potential bias of said given polarity between said row and column intersections and said remote anode to fully erase characters written on said display.

2. The display apparatus according to claim 1, wherein said control means is responsive to depression of a key to apply said first and second potential biases to a character selected thereby.

3. The display apparatus according to claim 1, wherein said control means causes said supply means to apply said first and second potential biases to blink a last character of a last character line of said display unless an alternate character is selected to be blinked.

4. The display apparatus according to claim 1, wherein said supply means is further responsive to said control means to supply a fourth potential bias of said opposite polarity between said row and column intersections and said remote anode to hold characters written on said display.

5. The display apparatus according to claim 1, further comprising an electrically conductive screen disposed between said remote anode and said matrix of row and column electrodes and having apertures for allowing said pigment particles to pass through.

6. The display apparatus according to claim 1, wherein said anode segments are arranged in a plurality of groups, each group including a plurality of parallel, electrically coupled line elements.

7. The display apparatus of claim 6, wherein each anode line element has at least two tines with spaces therebetween for at least a portion of the length thereof.

8. The display apparatus of claim 6, wherein the number of said groups is twenty-four, each of said groups having twenty-six line elements.

9. The display apparatus according to claim 6, wherein said line elements extend parallel to said column electrodes.

10. The display apparatus according to claim 6, wherein each of said groups has an overall width corresponding to the width of a displayed character area.

11. A method of operating an electrophoretic display to display a plurality of written character lines with at least one selected character of said display blinking in a manner visible to the user of said apparatus, said display being of the type including a fluid-tight envelope having a portion thereof which is at least partially transparent, an electrophoretic fluid contained within said envelope, said fluid having pigmented particles suspended therein, a matrix of row and column electrodes passing through said envelope and said fluid, a plurality of anode segments passing through said envelope, a remote anode isolated from said anode segments by said fluid, and an electrically conductive mesh screen disposed between said remote anode and said anode segments, wherein each displayed character area of said display is defined by at least one of the anode segments and by a corresponding group of row and column electrode intersections, said method comprising the steps of:
   (a) applying an alternating current to said mesh screen;

(b) supplying individual voltages to selected row and column intersections and to said anode segments to fully write characters to said display;

(c) selecting one of said characters written to said display for blinking;

(d) applying a first potential bias of a given polarity between a group of row and column intersections, said group corresponding to a displayed character area occupied by the character selected during said selecting step, and at least one associated anode segment long enough to cause pigment particles to move relative to said intersections and to thereby erase the selected character;

(e) applying a second potential bias of an opposite polarity between said associated anode segment and said group of row and column intersections for a period of time sufficient to rewrite the selected character to said displayed character area;

(f) sequentially alternating between steps (c) and (d) until a different character is selected for blinking.

12. The method according to claim 11, wherein a potential bias is provided between said selected row and column intersections and a remote anode of said display during said supplying step.

13. The method according to claim 12, wherein a character is selected for blinking during said selecting step by depressing a key.

14. The method of claim 11, wherein step (c) includes providing a voltage of approximately 0 to selected grid lines and a voltage of approximately 0 to said associated anode segment.

15. The method of claim 11, further including the step of supplying a voltage of a negative polarity to all grid lines other than those associated with said displayed character area while performing step (c).

16. The method of claim 11, further including the step of supplying a voltage of a positive polarity to all anode segments other than those associated with said displayed character area while performing step (c).

17. The method of claim 11, wherein steps (c) through (e) are performed under the control of a computer program.

* * * * *